(12) United States Patent　(10) Patent No.: US 7,661,504 B2
Odate　(45) Date of Patent: Feb. 16, 2010

(54) VEHICLE SEATBELT APPARATUS

(75) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/107,424

(22) Filed: Apr. 22, 2008

(65) Prior Publication Data

US 2008/0265551 A1　Oct. 30, 2008

(30) Foreign Application Priority Data

Apr. 24, 2007　(JP) .............................. 2007-114735

(51) Int. Cl.
*B60R 22/00* (2006.01)
(52) U.S. Cl. ........................... 180/270; 280/807; 701/45
(58) Field of Classification Search ................. 180/270, 180/268; 280/807; 340/457.1; 701/45
See application file for complete search history.

(56) References Cited

U.S. PATENT DOCUMENTS

2006/0157968 A1 * 7/2006 Kitazawa .................... 280/806
2007/0282505 A1 * 12/2007 Bolton et al. ................. 701/45

FOREIGN PATENT DOCUMENTS

JP　2006-175896　7/2006

* cited by examiner

*Primary Examiner*—Ruth Ilan
*Assistant Examiner*—Keith Frisby
(74) *Attorney, Agent, or Firm*—Rankin, Hill & Clark LLP

(57) ABSTRACT

Seatbelt apparatus includes a control device connected with a vehicle-mounted battery for controlling an operational state of a seatbelt on the basis of an opened/closed state of a buckle switch and electric power supplied by the battery. The control device has a first operation mode for operating with low-level electric power, and a second operation mode for operating with higher-level electric power. In the second operation mode, the control device is kept in a state capable of detecting the opened/closed state of the buckle switch. The apparatus also includes a storage section for storing a current state value of the buckle switch when the control device shifts from the second operation mode to the first operation mode.

7 Claims, 6 Drawing Sheets

VEHICLE SEATBELT APPARATUS

FIELD OF THE INVENTION

The present invention relates generally to vehicle seatbelt apparatus and, more particularly, to an improved seatbelt apparatus which performs an optimal operation by judging a state of a buckle switch when a control device shifts from a sleep state to a wake-up state.

BACKGROUND OF THE INVENTION

There have been known automotive vehicles of a type constructed in such a manner that, if given control is necessary even while an ignition switch is kept OFF in order to prevent discharge of a vehicle-mounted power supply, a control device for performing the given control is caused to shift to a so-called "sleep" state. When there arises a need for the control device to perform the given control while the control device is in the sleep state, a signal is supplied to a wake-up signal input terminal of the control device to place the control device in a wake-up or normal operating state.

In electronically-controlled vehicle seatbelt apparatus, once the seatbelt is detached from the body of a vehicle occupant while the control device is in the sleep state with the ignition switch kept in the OFF state, there arises a need to activate a motor to automatically take up the seatbelt into a predetermined storage position. Thus, the seatbelt apparatus are constructed so that, even while the control device is in the sleep state, electric power continues to be supplied to a buckle switch and its related detection section for detecting an attached (i.e., worn)/non-attached (i.e., non-worn) state of the seatbelt in such a manner that a detection signal indicative of an ON/OFF state of the buckle switch is supplied to the wake-up signal input terminal of the control device.

In connection with the seatbelt apparatus constructed in the aforementioned manner, Japanese Patent Application Laid-Open Publication No. 2006-175896 discloses a vehicle occupant protection apparatus that employs a technique for reducing electric power to be supplied to the detection section of the buckle switch. In connection with the buckle switch for detecting the attached/non-attached state of the seatbelt, the disclosed vehicle occupant protection apparatus includes a first detection circuit having a first switch that is opened when the seatbelt is worn or attached around the body of a vehicle occupant and closed when the seatbelt is not attached, and a second detection circuit having a second switch that is closed when the seatbelt is attached around the body of the vehicle occupant and opened when the seatbelt is not attached. The control device in the form of an ECU supplies electric power to the first or second detection circuit of which the switch is in the opened state. Further, operation of a driving motor is controlled by the control device on the basis of a detection signal output from the first or second detection circuit currently supplied with electric power. When the control device (ECU) is in the sleep state, the sleep state is canceled once a change occurs in the detection signal output from the first or second detection circuit. Further, the disclosed apparatus is constructed to stop the electric power supply to each of the first or second detection circuits when the switch in the circuit is in the closed state, to thereby reduce the electric power supply.

Reducing the electric power to be supplied to the detection section of the buckle switch in the vehicle seatbelt apparatus is an important technique from the viewpoint of reduction in power consumption of a battery, but the conventionally-known technique does not consider at all how the seatbelt should be controlled in accordance with the current state of the buckle switch when the control device has woken up. Thus, when the seatbelt was paid out while the control device was in the sleep state, there would occur a situation against the wish of the vehicle applicant seated in the seat, so that comfortable attachment of the seatbelt is unattainable.

SUMMARY OF THE INVENTION

In view of the foregoing prior art problems, it is an object of the present invention to provide an improved seatbelt apparatus which can appropriately perform its belt taking-up or belt storing operation by identifying an ON/OFF state of a buckle switch before and after a shift, to a sleep state, of a control device of the seatbelt apparatus and thereby appropriately selecting an operation at the time of activation from the sleep state.

In order to accomplish the above-mentioned object, the present invention provides an improved vehicle seatbelt apparatus, which comprises: a buckle switch for detecting connection between a tongue plate attached to a belt and a buckle fixed to a vehicle body; a control device connected with a vehicle-mounted power supply for controlling an operational state of the belt on the basis of an opened/closed state of the buckle switch and electric power supplied by the vehicle-mounted power supply, the control device having a first operation mode in which the control device operates with low-level electric power and a second operation mode in which the control device operates with electric power higher than the low-level electric power and the control device is kept in a state capable of detecting the opened/closed state of the buckle switch; and a storage section for storing a state value of the buckle switch when the control device shifts from the second operation mode to the first operation mode.

Preferably, the control device includes a comparison section for, when the control device shifts from the first operation mode to the second operation mode, comparing a current detected state value of the buckle switch and the state value stored in the storage section.

Preferably, the vehicle seatbelt apparatus further comprises a motor for rotationally driving a belt reel having the belt wound thereon, and the control device has a plurality of control modes for taking up the belt by controlling electric power supply to the motor, the control device selecting and executing one of the control modes on the basis of a result of comparison made by the comparison section when the control device shifts from the first operation mode to the second operation mode.

Preferably, the plurality of control modes for taking up the belt include a belt storing mode for taking up the belt to a predetermined storage position, and a slack eliminating mode for eliminating slack of the belt when the belt is attached around a vehicle occupant.

Preferably, the control device includes a first connection path for connecting the control device to the vehicle-mounted power supply via an ignition switch and a second connection path for connecting the control device to the vehicle-mounted power supply bypassing the ignition switch, and either one of the first and second connection paths is selectively used to connect the control device to the vehicle-mounted power supply.

Preferably, the control device selectively executes any one of the plurality of control modes on the basis of a selected one of the first and second connection paths.

According to the present invention, when the control device shifts from the first operation mode (sleep state) to the second operation mode (wake-up state), the vehicle seatbelt apparatus can appropriately perform its belt taking-up or belt storing operation by the control device identifying an ON/OFF state of the buckle switch before and after the shift and appropriately selecting an optimal operation at the time of activation from the sleep state.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
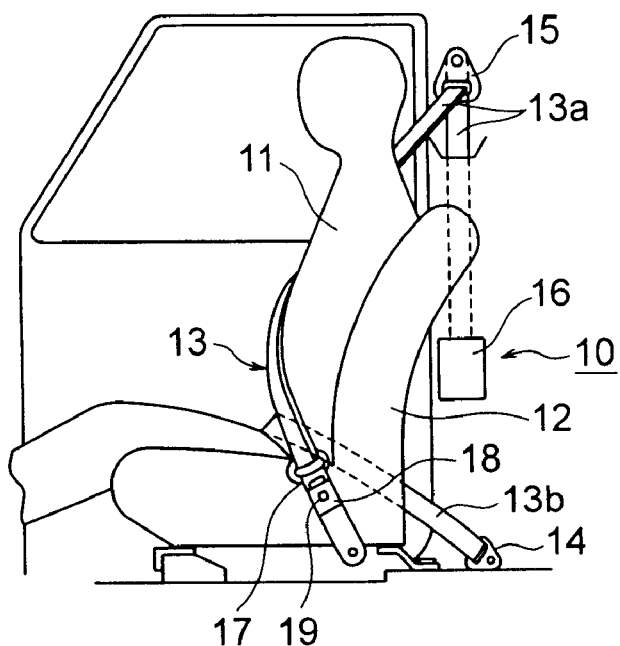
FIG. 1 is a side view showing how a vehicle seatbelt apparatus according to an embodiment of the present invention is attached around the body of a vehicle occupant.
Figure 2:
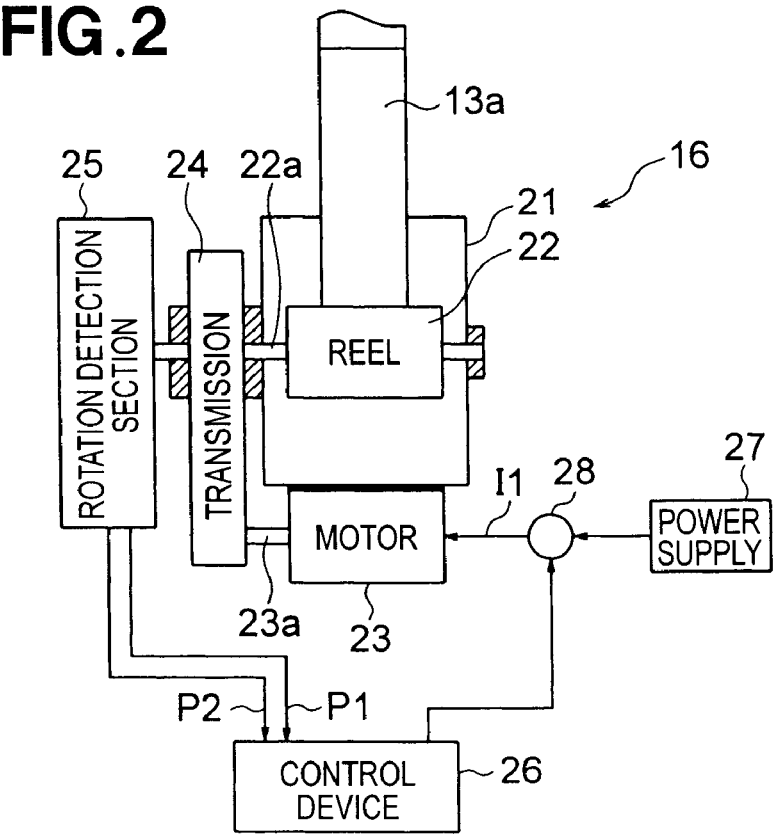
FIG. 2 is a view showing an example construction of a seatbelt retractor employed in the vehicle seatbelt apparatus of the present invention.

First, a description will be given about a fundamental structure of a vehicle seatbelt apparatus according to an embodiment of the present invention with reference to FIGS. 1 and 2. FIG. 1 shows a vehicle seatbelt apparatus 10 according to an embodiment of the present invention which is provided on, for example, a driver seat of a vehicle; in the figure, the vehicle seatbelt apparatus 10 is in an attached state where the seatbelt is attached around the body of a vehicle occupant. FIG. 2 shows an example construction of a seatbelt retractor employed in the embodiment. This vehicle seatbelt apparatus 10 is an electric seatbelt apparatus driven by an electric motor, where, once the vehicle occupant (driver) seated in the driver seat has the seatbelt attached around its body, the seatbelt is taken up appropriately, on the basis of motor drive control by a control device, to optimally protectively restrain the vehicle occupant.

In FIG. 1, the seatbelt apparatus 10 includes a belt (webbing) 13 for tying or restraining the body of the vehicle occupant 11 to the seat 12. The seatbelt 13 is of a three-point support structure, and it includes an upper belt portion 13a for restraining an upper body portion of the vehicle occupant 11 and a lower belt portion 13b for restraining a waist portion of the vehicle occupant 11. The lower belt portion 13b is fixed at one end thereof to a vehicle body portion, located in a lower area of a vehicle compartment, by means of an anchor plate 14. The upper belt portion 13a is folded back via a through-anchor 15 provided near the shoulder of the vehicle occupant 11, and it is connected at one end to a belt reel of the retractor 16. Tongue plate 17 is attached to a region of the belt 13 where the respective distal ends of the upper and lower belt portions 13a merge with each other. The tongue plate 17 is detachably attached to a buckle 18 fixed to one side of a lower seat section of the seat 12, and a buckle switch 19 for detecting connection, to the tongue plate 17, of the buckle 18 is provided in the buckle 18.

FIG. 2 shows an example general construction of primary sections of the seatbelt retractor 16. The retractor 16 includes the belt reel (spindle) 22 rotatably mounted in a housing 21, and a motor 23 for rotationally driving the belt reel 22. The upper belt portion 13a is connected at the one end thereof to the belt reel 22 as noted above, so that it can be taken up by the belt reel 22. The belt reel 22 has a shaft 22a connected, via a power transmission mechanism (e.g., gear mechanism) 24, to a drive shaft 23a of the motor 23; thus, the belt reel 22 is rotationally driven by the motor 23 via the power transmission mechanism 24. The seatbelt retractor 16 also includes a belt take-up position detection section 25 connected to the shaft 22a of the belt reel 22.

The take-up position detection section 25 preferably comprises a rotation angle sensor that is, for example, in the form of a magnetic sensor unit comprising a combination of a magnetic disk and two Hall ICs.

The take-up position detection section 25 is capable of detecting a belt take-up position of the belt reel 22 by detecting a rotation angle of the belt reel 22 by means of the rotation angle sensor provided therein. Detection signal output from the take-up position detection section 25 is supplied to the control device 26. Rotational operation, i.e. belt take-up or belt pay-out operation, of the retractor 16 is controlled by the control device 26. More specifically, the control device 26 controls the belt take-up operation of the retractor 16 by controlling, by means of an adjustment section 28, an amount of a driving electric current I1 to be supplied from a motor-driving power supply 27 to the motor 23. The seatbelt retractor 16, whose operation is controlled by the control device 26, is constructed as an electric-type pretensioner (E-PT) for holding the vehicle occupant 11 in a proper posture and position.

Whereas the vehicle seatbelt apparatus 10 and retractor 16 etc, included in the seatbelt apparatus 10 have been described above as provided on the driver seat, a similar seatbelt apparatus 10, retractor 16, etc. are also provided on a front passenger seat. In the following description, various components provided on the driver seat will sometimes be mentioned with a prefix "R-side", while various components provided on the front passenger seat will sometimes be mentioned with a prefix "L-side.

Next, a description will be given about an example inner construction of the control device 26 and an example construction of an electric power supply system in the seatbelt apparatus 10.

The control device 26 includes an arithmetic processing control section 31 and a storage section 32. The arithmetic processing control section 31 comprises a CPU, and the storage section 32 has stored therein a first operation mode control execution program 41, second operation mode control execution program 42, belt storing mode control execution program 43, slack eliminating mode control execution program 44 and various data 45.

The control device 26 is connected to a vehicle-mounted battery (or vehicle-mounted power supply) 33 so that it is kept activated by being supplied with electric power from the battery 33. For supplying electric power from the vehicle-mounted battery 33 to the control device 26, there are provided a connection path 35 passing through an ignition switch 34, and another connection path 37 activated (triggered) for the electric power supply in response to operation of a vehicle door switch 36. The connection path 37 includes a connection section 37a that is opened and closed in response to ON/OFF operation of the vehicle door switch 36. The door switch 36 is provided on, for example, a door to the driver seat (or door to the front passenger seat). The connection path 37 for supplying electric power to the control device 26 is a path that bypasses the ignition switch 34. The control device 26 is connected to the vehicle-mounted battery 33 via any one of the two connection paths 35 and 37 so that it is supplied with necessary electric power with an appropriate level corresponding to a given condition.

A signal indicative of an opened/closed state (ON/OFF state) of the ignition switch 34 and a signal indicative of an opened/closed state (ON/OFF state) of the door switch 36 are both input to the control device 26. The opened/closed state (ON/OFF state) of the ignition switch 34 can also be identified from presence/absence of electric power supply from the vehicle-mounted battery 33.

Further, the above-mentioned buckle switch 19 is also provided as an input-side component for the control device 26, and the motor 23 is provided as an output-side component for the control device 26. The buckle switch 19 supplies the control device 26 with a signal indicative of a state of connection/non-connection between the tongue plate 17 and buckle 18 of the driver seat 12, i.e. ON/OFF state of the buckle switch 19.

The ON/OFF state of the buckle switch 19, ON/OFF state of the ignition switch 34 and ON/OFF state of the door switch 36 input to the control device 26 are stored as data 45 into the storage section 32.

Figure 4:
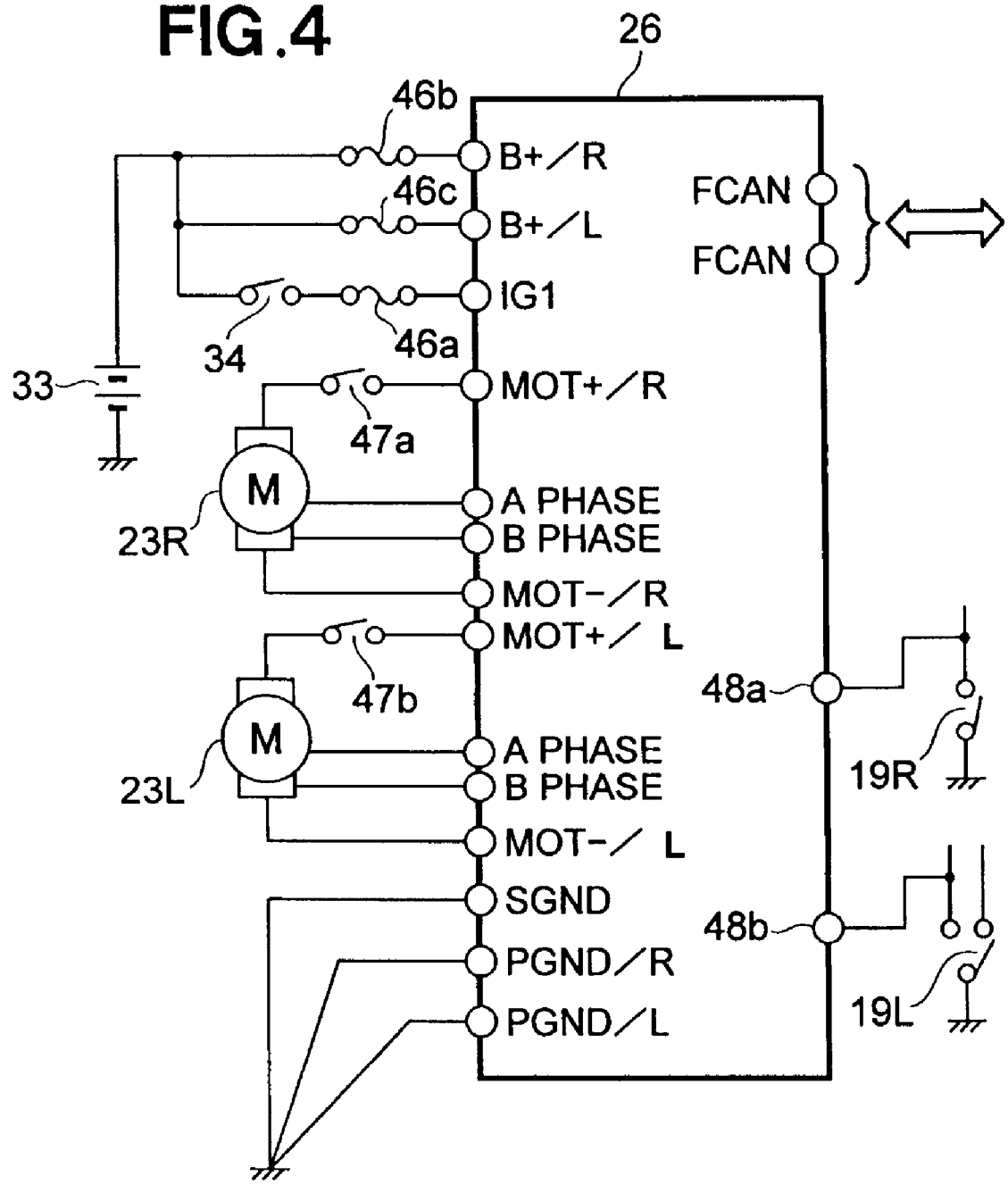
FIG. 4 is a diagram showing a circuit construction of the control device in the vehicle seatbelt apparatus of the present invention.

FIG. 4 shows the control device 26 as a block of an electric circuit board, as well as input-side and output-side components and electric power supply components and grounding components of the control device 26.

As shown, the control device 26 includes a plurality of input terminals and output terminals. Positive pole terminal of the vehicle-mounted battery 33 is connected not only to a power supply terminal (IG1) of the control device 26 by way of the ignition switch and fuse 46a, but also to two power supply terminals (B+/R) and (B+/L) by way of fuses 46b and 46c. The power supply terminal (B+/R) is for a right-side motor, while the power supplyterminal (B+/L) is for a left-side motor. The above-mentioned connection path 35 of FIG. 3 connects the battery 33 to the power supply terminal (IG1) via the ignition switch 34, and the above-mentioned connection path 37 of FIG. 3, bypassing the ignition switch 34 connects the right- and left-side motors 23R and 23L to the power supply terminals (B+/R) and (B+/L).

Figure 3:
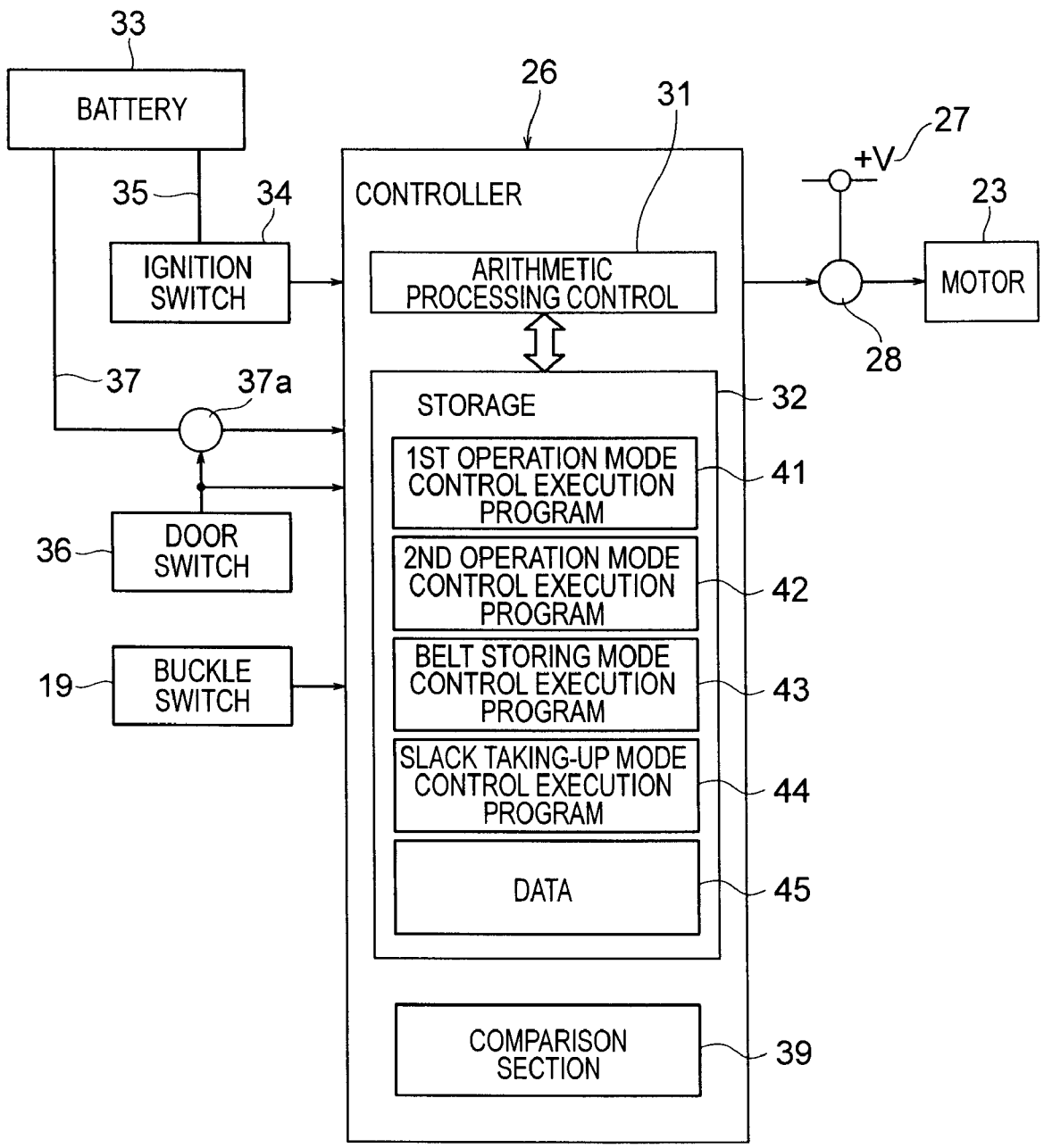
FIG. 3 is a block diagram showing an example construction of a control device employed in the vehicle seatbelt apparatus of the present invention.

The right-side motor 23R is a motor for the seatbelt apparatus of the driver seat and corresponds to the aforementioned motor 23 of FIGS. 2 and 3, and this motor 23R is connected between two output terminals (MOT+/R) and (MOT−/R). Overheat protecting switch 47a is provided at a position preceding the output terminal (MOT+/R). The right-side motor 23L is a motor for the seatbelt apparatus of the front passenger seat, and this motor 23L is connected between two output terminals (MOT+/L) and (MOT−/L). Overheat protecting switch 47b is provided at a position preceding the output terminal (MOT+/L).

The grounding components comprise three grounding terminals (SGND), (PGND/R) and (PGND/L), each of which is connected to the ground. The grounding terminal (SGND) is for a signal line, the grounding terminal (PGND/R) is a terminal for an electric power line for the right-side motor 23R, and the grounding terminal (PGND/L) is for an electric power line for the left-side motor 23L.

The buckle switch 19R is for the seatbelt apparatus of the driver seat and corresponds to the aforementioned buckle switch 19 of FIG. 1, and the buckle switch 19L is for the seatbelt apparatus for the front passenger seat. A signal indicative of an opened/closed state of the buckle switch 19R is input to an input terminal 48a of the control device 26, while a signal indicative of an opened/closed state of the buckle switch 19L is input to an input terminal 48b of the control device 26.

Further two terminals (FCAN) are connected to an in-vehicle network (commonly known as "CAN" or "Controller Area Network"). The above-mentioned signal indicative of the opened/closed state (ON/OFF state) of the door switch 36 is input between the two terminals (FCAN) via the in-vehicle network. When the door switch 36 has been turned on, the ON signal is input from the door switch 36 to between the terminals (FCAN). While the ignition switch 34 is OFF, the power-supplying connection path bypassing the ignition switch 34 is established.

The following paragraphs describe how behavior of the seatbelt apparatus 10 is controlled. Such behavioral control of the seatbelt apparatus 10 is performed on the basis of the first operation mode control execution program 41, second operation mode control execution program 42, belt storage mode control execution program 43, slack eliminating mode control execution program 44 and various data 45.

The seatbelt apparatus 10 can take three different operational states: wake-up state; partial sleep state and sleep state. The behavior of the seatbelt apparatus 10 is controlled optimally in response to a shift or transition between these three operational states.

The "wake-up state" is a state where the ignition switch 34 is ON so that electric power is being supplied from the vehicle-mounted battery 33 to the control device 26 via the connection path 35. The "partial sleep state" is a state where the ignition switch 34 is OFF so that electric power is being supplied from the vehicle-mounted battery 33 to the control device 26 via the connection path 37. Further, the "sleep state" is a state where no electric power is supplied from the vehicle-mounted battery 33 to the control device 26 (i.e., where the electric power supply from the vehicle-mounted battery 33 to the control device 26 is completely shut off).

Figure 5:
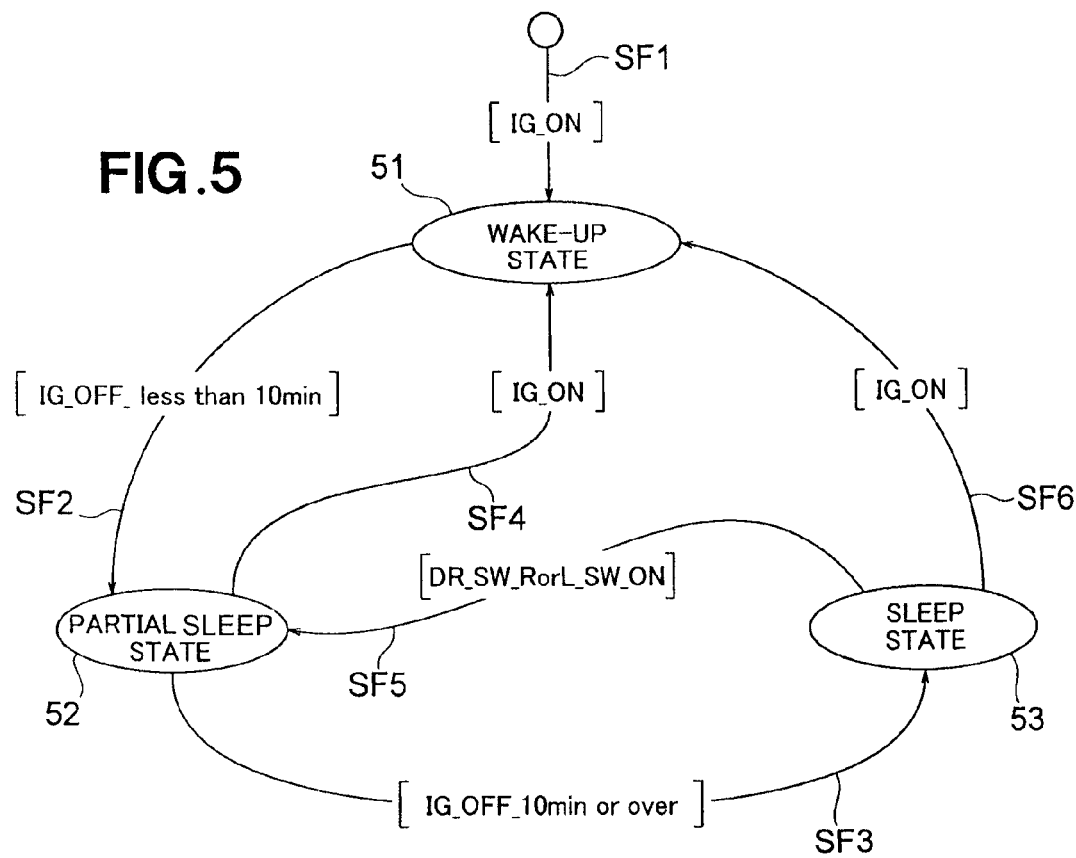
FIG. 5 is a diagram showing transitional relationships among three operational states of the control device in the vehicle seatbelt apparatus of the present invention.

FIG. 5 shows transitional relationships among the above-mentioned three operational states. Reference numeral 51 in the figure indicates the wake-up state, 52 the partial sleep state, and 53 the sleep state. Once the ignition switch 34 is turned on ([IG_ON]), electric power is supplied from the vehicle-mounted battery 33 to the control device 26 via the connection path 35 so that the seatbelt apparatus 10 shifts or transits to the wake-up state 51 (transition SF1) and then the seatbelt apparatus 10 is kept in an active state; the wake-up state may also be referred to as a normal operating state. Once the ignition switch 34 is turned off in the wake-up state 51, the seatbelt apparatus 10 shifts to the partial sleep state 52 (transition SF2) and then is kept in the partial sleep state until ten minutes passes after the turning-off of the ignition switch 34 ([IG_OFF_less than 10 min]). Once ten minutes passes in the partial sleep state 52 after the turning-off of the ignition switch 34 ([IG_OFF_10 min or over]), the seatbelt apparatus 10 shifts to the sleep state 53 (transition SF3). Further, once the ignition switch 34 is turned on in the partial sleep state ([IG_ON]), the seatbelt apparatus 10 returns to the wake-up state 51 (transition SF4). In the sleep state 53, any one of two transitions SF5 and SF6 can occur. Namely, the transition SF5 is a state where the seatbelt apparatus 10 returns to the partial sleep state 52 in response to turning-on of the (R-side or L-side) door switch 36 ([DR_SW_RorL_SW_ON]); this transition SF5 will hereinafter be referred to as "door wake". The transition SF6 is a state where the seatbelt apparatus 10 returns to the wake-up state 51 in response to turning-on of the ignition switch 34 ([IG_ON]); this transition SF6 will hereinafter be referred to as "IG wake".

In the wake-up state 51 of the seatbelt apparatus 10, the control device 26 performs normal control. Namely, with the ignition switch 34 ON, electric power is supplied from the vehicle-mounted battery 33 to the control device 26 via the connection path 35 so that the behavior of the seatbelt apparatus 10 is controlled by the control device 26 in a normal manner. In the wake-up state 51, the control device 26 operates in a second operation mode where it operates with normal-level electric power and is kept in a state capable of detecting the opened/closed state of the buckle switch 19. Further, in each of the partial sleep state 52 and sleep state 53, the control device 26 operates in a first operation mode where it operates with low-level electric power via the connection path 37 bypassing the ignition switch 34. Namely, the control device 26 operates in the second operation mode with greater electric power than in the first operation mode.

Table 1 below shows operational state transitions in the seatbelt apparatus 10.

TABLE 1

|  | Partial Sleep State | | Wake-up State | |
| --- | --- | --- | --- | --- |
|  | Door Wake + Buckle ON | Door Wake + Buckle OFF | IG Wake + Buckle ON | IG Wake + Buckle OFF |
| Buckle ON →Sleep | No Control Performed | Belt Storage | Slack Take-up | Belt Storage |
| Buckle OFF →Sleep | Slack Take-up | No Control Performed | Slack Take-up | No Control Performed |

In Table 1, two operational states, "partial sleep state" and "wake-up state", are shown in the uppermost row. The "partial sleep state" has two transition conditions, i.e. "door wake+buckle ON" and "door wake+buckle OFF". "buckle ON" means turning-on of the buckle switch 19, while "buckle OFF" means turning-off of the buckle switch 19. Thus, "door wake+buckle ON" mean that the door wake and turning-on of the buckle switch 19 have occurred simultaneously, while "door wake+buckle OFF" means that the door wake and turning-off of the buckle switch 19 have occurred simultaneously. Further, the "wake-up state" has two transition conditions, i.e. "IG wake+buckle ON" and "IG wake+buckle OFF". "IG wake+buckle ON" means that the IG wake and turning-on of the buckle switch 19 have occurred simultaneously, while "IG wake+buckle OFF" means that the IG wake and turning-off of the buckle switch 19 have occurred simultaneously.

Further, in Table 1, "buckle ON→sleep" and "buckle OFF→sleep" are shown in the leftmost column. "buckle ON→sleep" means that the seatbelt apparatus has shifted to the sleep state with the buckle switch 19 ON, while "buckle OFF→sleep" means that the seatbelt apparatus has shifted to the sleep state with the buckle switch 19 OFF.

In the case of "buckle ON→sleep" in Table 1, "No Control", "Belt Storage", "Slack Take-up" and "Belt Storage" are executed, respectively, in response to "Door Wake+Buckle ON" and "Door Wake+Buckle OFF" of the partial sleep state and "IG Wake+Buckle ON" and "IG Wake+Buckle OFF" of the wake-up state. This means that, when the seatbelt apparatus 10 has shifted to the sleep state with the buckle switch 19 ON, i.e. in a first operation mode where the control device 26 operates with the low-level electric power, the "No Control", "Belt Storage", "Slack Take-up" and "Belt Storage" are appropriately executed, respectively, in response to "Door Wake+Buckle ON" and "Door Wake+Buckle OFF" of the partial sleep state and "IG Wake+Buckle ON" and "IG Wake+Buckle OFF" of the wake-up state.

Further, in the case of "buckle OFF→sleep" in Table 1, "Slack Take-up", "No Control", "Slack Take-up" and "No Control" are executed, respectively, in response to "Door Wake+Buckle ON" and "Door Wake+Buckle OFF" of the partial sleep state and "IG Wake+Buckle ON" and "IG Wake+Buckle OFF" of the wake-up state. This means that, when the seatbelt apparatus 10 has shifted from the sleep state to the wake-up state, i.e. in a second operation mode where the control device 26 operates with the normal-level electric power, "Slack Take-up", "No Control", "Slack Take-up" and "No Control" are appropriately executed, respectively, in response to "Door Wake+Buckle ON" and "Door Wake+Buckle OFF" of the partial sleep state and "IG Wake+Buckle ON" and "IG Wake+Buckle OFF" of the wake-up state.

When the control device 26 of the seatbelt apparatus 10 shifts from the second operation mode (i.e., operation mode with the normal-level electric power) to the first operation mode (i.e., operation mode with the low-level electric power), the current state value (i.e., ON or OFF state) of the buckle switch 19 is stored into the storage section 32. The control device 26 has a comparison function (section) 39 for, when the control device 26 shifts from the first operation mode to the second operation mode, comparing the current state value of the buckle switch 19 detected at the time of the shift and the state value stored in the storage section 32. The comparison function (section) 39 is implemented by the above-mentioned arithmetic processing control section 31 executing a comparison function contained in the aforementioned program. The control device 26 has a plurality of control modes, i.e. slack taking-up operation mode and belt storing operation mode, for controlling the amount of power supply to the motor, on the basis of the stored content in the storage section 32, to thereby take up the seatbelt, and, upon shifting from the first operation mode to the second operation mode, the control device 26 selects and performs one of the slack taking-up operation mode and belt storing operation mode on the basis of the result of the comparison by the comparison function (section) 39.

Further, in the wake-up state, the control device 26 is supplied with normal-level electric power over the connection path 35 connected with the vehicle-mounted battery 33 via the ignition switch 34. In the partial sleep state, the control device 26 is supplied with low-level electric power over the connection path 37 bypassing the ignition switch 34. Thus, depending on whether the control device 26 is in the ignition switch 34 or in the partial sleep state, either one of the two connection paths 35 and 37 is selectively used. Further, on the basis of the selected one of the connection paths 35 and 37, the control device 26 selectively performs one of the slack eliminating and belt storing operation modes.

Figure 6:
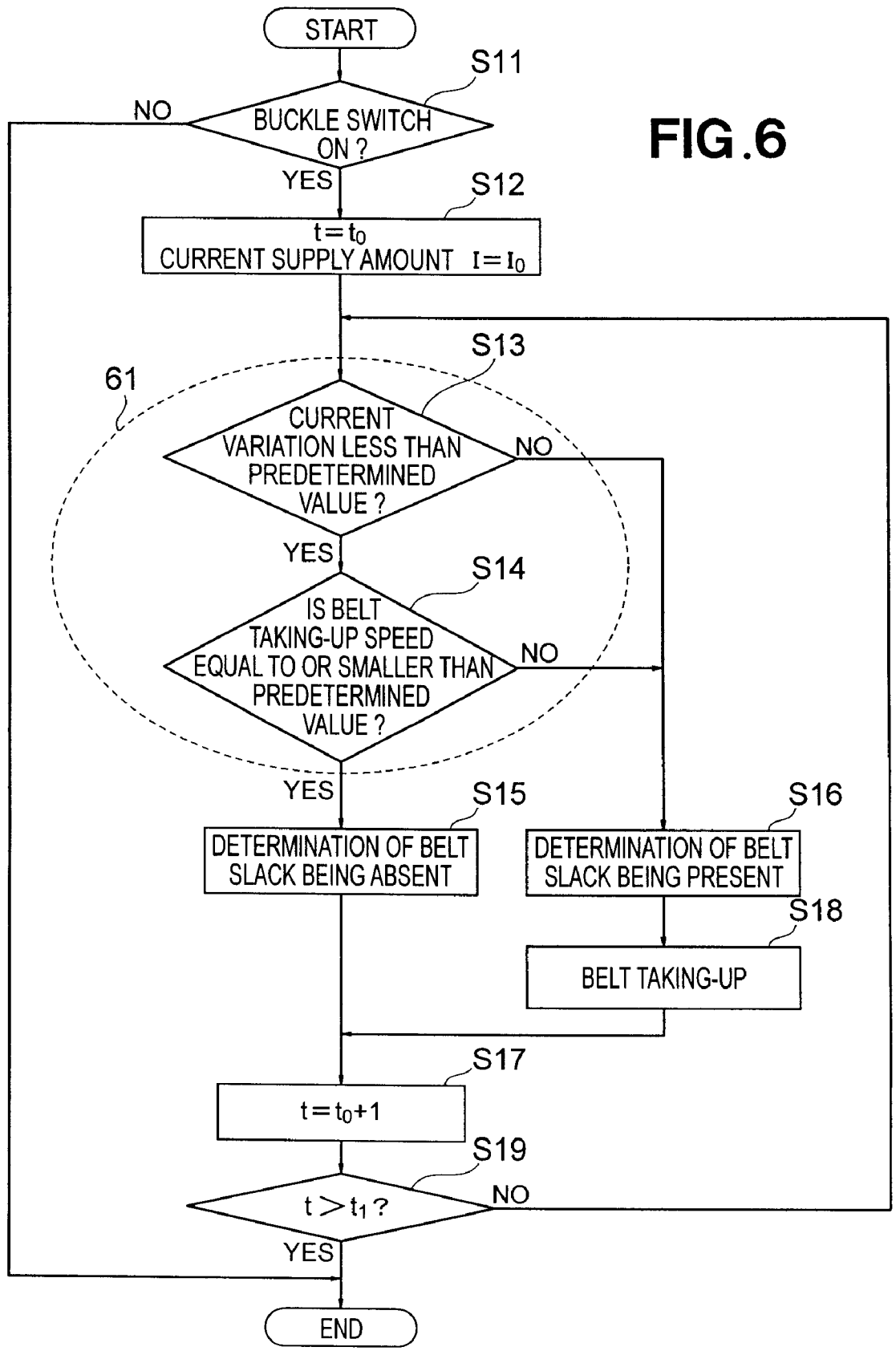
FIG. 6 is a flow chart showing a control flow of a belt slack eliminating operation performed in the vehicle seatbelt apparatus of the present invention.

The following paragraphs describe a control flow of the slack eliminating operation performed by the control device 26 for taking up slack of the seatbelt 13, with reference to FIG. 6. The slack eliminating operation is performed on condition that the buckle switch 19 is ON (i.e., that a YES determination has been made at step S11). When the buckle switch 19 is OFF, the control flow is immediately brought to an end without the slack eliminating operation being performed. When the slack eliminating operation is to be started, a time variable t is set at $t_O$, and a detected value ($I_O$) of electric power supply for driving the motor is set as a variable I at step S12. Then, determinations are made successively as to whether variation in the driving current to be supplied to the motor is equal to or smaller than a predetermined value (step S13) and whether a belt taking-up speed is equal to or smaller than a predetermined value (step S14). Only when a YES determination has been made at each of these two determination steps S13 and S14, it is determined at step S15 that the belt has no slack. If a NO determination has been made at either one of steps S13 and S14, it is determined at step S16 that the belt has slack. If the belt has no slack as determined at step S15, the flow goes directly to step S17, where the time variable t is incremented by a counter function of the control device 26. If the belt has slack as determined at step S16, control goes to step S18, where a driving current is supplied to the motor to take up the belt. After that, control goes to step S17, and then, a determination is made, at step S19, as to whether the current value of the time variable t has exceeded a predetermined value $t_1$. With a NO determination at step S19, control reverts to step S13 so that the operations at and after step S13 are repeated. With a YES determination at step S19, on the other hand, the instant slack eliminating operation control flow is brought to an end. In the aforementioned manner, the slack eliminating operation control is carried out whenever it is determined that the seatbelt has slack.

The determinations regarding presence/absence of slack in the belt at steps S13 and S14, enclosed by a dotted-line elliptic block in FIG. 6, may be made using any of other suitable factors, such as a predetermined value of the belt take-up amount, a predetermined value of tension of the belt, a predetermined value of either one of supplied current variation and belt taking-up speed, etc.

Figure 7:
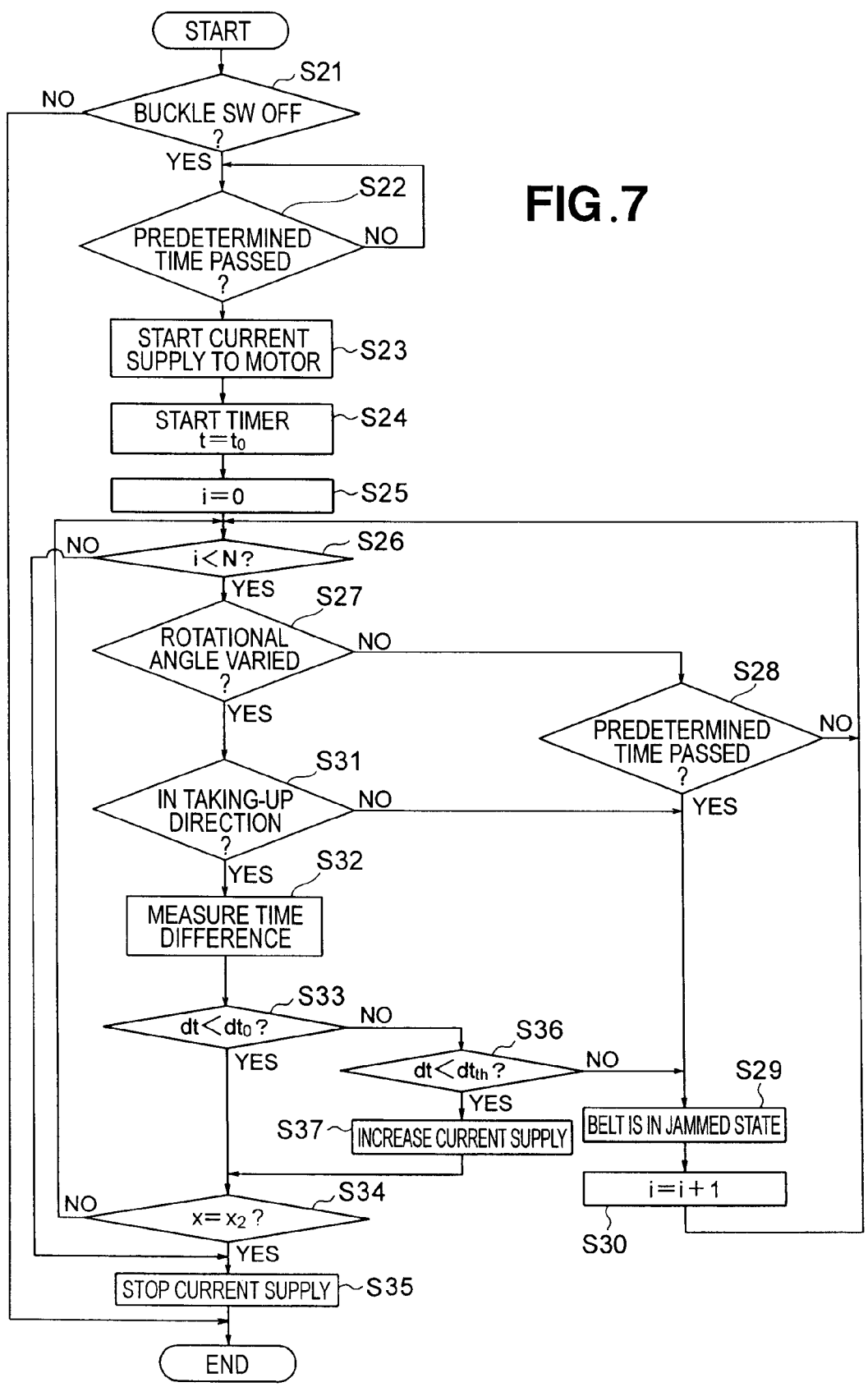
FIG. 7 is a flowchart showing a control flow of a belt storing operation performed in the vehicle seatbelt apparatus of the present invention.

The following paragraphs describe a control flow of a belt storing operation performed by the control device 26, with reference to FIG. 7. The belt storing operation control is performed on condition that the buckle switch 19 is OFF (i.e., that a YES determination has been made at step S21). Then, it is determined, at step S22, whether a predetermined time has passed. With a YES determination at step S22, electric current supply to the motor is started to cause the motor to take up the seatbelt at step S23. Then, time counting by a timer is started with the time variable t set at an initial value to.

Then, a predetermined variable i is set at "0" at step S25. The variable i is set as a counter that is used to determine a state of jamming of the belt 13 that may occur during the storing of the belt 13. Jamming of the seatbelt 13 is finally determined when the determination that the belt is currently jammed has lasted until the variable i exceeds a predetermined value N.

At step S26, a determination is made as to whether the variable i is currently smaller than the value N. If the variable i is smaller than the value N as determined at step S26, control proceeds to step S27, where a further determination is made as to whether variation has occurred in the rotational angle of the belt reel 22; the rotational angle of the belt reel 22 can be acquired on the basis of a signal obtained via the belt take-up position detection section 25 etc.

If the he variable i is equal to or greater than the value N, it is assumed that some locking condition has occurred in the belt storing operation by the retractor 16 due to jamming of the belt 13 that occurred during the belt storing operation, and then, control goes to step S35, where the electric power supply to the motor is terminated to stop the belt storing operation.

Presence/absence of variation in the rotational angle of the reel 22 determined at step S27 above is information that can be obtained practically on the basis of two pulse signals of different phases output from the belt take-up position detection section 25.

If no variation has occurred in the rotational angle of the belt reel 22 as determined at step S27 (NO determination at step S27) and such a "no variation" condition has lasted for a predetermined time (YES determination at step S28), it is determined, at step S29, that the belt 13 is currently in a jammed state. Then, the variable i is incremented by one at step S30, after which control reverts to step S26. If NO determination is made at step S26, control immediately goes to step S35. Thus, occurrence of the jammed state of the belt 13 during the belt storing operation is detected and monitored.

If, on the other hand, variation has occurred in the rotational angle of the belt reel 22 as determined at step S27 (YES determination at step S27), control proceeds to step S31, where a further determination is made as to whether or not the current rotation of the belt reel 22 is in the belt taking-up direction. With a NO determination at step S31, it means that the current rotation of the belt reel 22 is not in the normal belt taking-up direction, and thus, control branches to step S29 where it is further determined that the belt 13 is currently in a jammed state. After that, control reverts to step S26 by way of step S30. With a YES determination at step S31, a difference (dt) between the time of the last rotational angle variation ($t_{1-1}$) and the time of the current rotational angle variation ($t_1$) (i.e., $dt=t_1-t_{1-1}$) is measured at step S32.

At step S33, the measured time difference dt is compared against a first jam-determining reference value $dt_O$ to determine whether the time difference dt is smaller than the reference value $dt_O$. If the time difference dt is smaller than the reference value $dt_O$, it is further determined, at step S34, whether the belt 13 has been stored into a predetermined original storage position (i.e., fully-stored position), i.e. whether an amount of displacement x of the belt 13 being taken up has reached a predetermined value $x_2$ (i.e., $x=x_2$?). With a YES determination at step S34, control proceeds to step S35, where the power supply to the motor is terminated judging that the belt storing operation has been completed. With a NO determination at step S34, control reverts to step S26.

If a NO determination has been made at step S33, i.e. if the time difference dt is not smaller than the reference value $dt_O$, control branches to step S36. At step S36, the measured time difference dt is compared against a second jam-determining reference value $dt_{th}$ to determine whether the time difference dt is smaller than the reference value $dt_{th}$. If the time difference dt is smaller than the second jam-determining reference value $dt_{th}$, the electric power supply to the motor is increased to increase the belt taking-up force at step S37, after which control goes to step S34. If the time difference dt is not smaller than the second jam-determining reference value $dt_{th}$, on the other hand, control proceeds to step S29 to determine that the belt 13 is in a jammed state.

It should be appreciated that various constructions, shapes, sizes, positions, etc. explained above in relation to the preferred embodiment are just for illustrative purposes, and that the present invention is not limited to the embodiment described above and may be modified variously without departing from the scope indicated by the appended claims.

The above-described invention can be suitably used to optimally control the belt storing and slack eliminating operations of any seatbelt apparatus desired for protection of vehicle occupants in a driver seat etc.

Obviously, various minor changes and modifications of the present invention are possible in light of the above teaching. It is therefore to be understood that within the scope of the appended claims the invention may be practiced otherwise than as specifically described.

What is claimed is:

1. A vehicle seatbelt apparatus comprising:
a buckle switch for detecting connection between a tongue plate attached to a belt and a buckle fixed to a vehicle body;
a control device connected with a vehicle-mounted power supply for controlling an operational state of the belt on a basis of an opened/closed state of said buckle switch and electric power supplied by the vehicle-mounted power supply, said control device having a first operation mode in which said control device operates with low-level electric power and a second operation mode in which said control device operates with electric power higher than the low-level electric power and said control device is kept in a state capable of detecting the opened/closed state of the buckle switch; and
storage means for storing a state value of the buckle switch when said control device shifts from said second operation mode to said first operation mode.

2. The vehicle seatbelt apparatus of claim 1, wherein said control device includes comparison means for, when said control device shifts from said first operation mode to said second operation mode, comparing a current detected state value of the buckle switch and the state value stored in said storage means.

3. The vehicle seatbelt apparatus of claim 2, further comprising a motor for rotationally driving a belt reel having the belt wound thereon, and wherein said control device has a plurality of control modes for taking up the belt by controlling electric power supplied to said motor, said control device selecting and executing one of the control modes on a basis of a result of comparison made by said comparison means when said control device shifts from said first operation mode to said second operation mode.

4. The vehicle seatbelt apparatus of claim 3, wherein said plurality of control modes for taking up the belt include a belt storing mode for taking up the belt to a predetermined storage position, and a slack eliminating mode for eliminating slack of the belt when the belt is attached around a vehicle occupant.

5. The vehicle seatbelt apparatus of claim 1, wherein said control device includes a first connection path for connecting said control device to the vehicle-mounted power supply via an ignition switch and a second connection path for connecting said control device to the vehicle-mounted power supply bypassing the ignition switch, and wherein either one of the first and second connection paths is selectively used to connect said control device to the vehicle-mounted power supply.

6. The vehicle seatbelt apparatus of claim 5, wherein said control device has a plurality of control modes for taking up the belt by controlling electric power supplied to said motor, and said control device selectively executes any one of said plurality of control modes on a basis of a selected one of said first and second connection paths.

7. The vehicle seatbelt apparatus of claim 6, wherein said plurality of control modes for taking up the belt include a belt storing mode for taking up the belt to a predetermined storage position, and a slack eliminating mode for eliminating slack of the belt when the belt is attached around a vehicle occupant.

* * * * *